(12) United States Patent
Parker et al.

(10) Patent No.: US 7,477,021 B2
(45) Date of Patent: Jan. 13, 2009

(54) NON-DISCONTINUOUS NEON POWER SUPPLY WITH HIGH POWER FACTOR

(75) Inventors: Francis J. Parker, Cooper City, FL (US); Robert Crawbuck, Jupiter, FL (US); Emilian Padurariu, West Palm Beach, FL (US)

(73) Assignee: Inshore Holdings, LLC, Miami, FL (US)

( * ) Notice: Subject to any disclaimer, the term of this patent is extended or adjusted under 35 U.S.C. 154(b) by 146 days.

(21) Appl. No.: 11/522,735

(22) Filed: Sep. 18, 2006

(65) Prior Publication Data
US 2008/0067945 A1   Mar. 20, 2008

(51) Int. Cl.
*H05B 41/16* (2006.01)
(52) U.S. Cl. .............. 315/247; 315/209 R; 315/291; 315/276; 315/DIG. 7; 363/24; 363/109

(58) Field of Classification Search ............. 315/209 R, 315/247, 91, 244, 276, DIG. 4, DIG. 7, 307, 315/291; 363/21.02, 21.04, 24, 44, 97, 98, 363/109, 108, 37, 89
See application file for complete search history.

(56) References Cited

U.S. PATENT DOCUMENTS

| | | | |
|---|---|---|---|
| 5,155,415 A | 10/1992 | Schmidt et al. | |
| 5,353,214 A | 10/1994 | Kim | |
| 5,497,310 A | 3/1996 | Noda et al. | |
| 6,181,075 B1 | 1/2001 | Doss | |
| 6,191,956 B1 | 2/2001 | Foreman | |
| 6,259,215 B1 * | 7/2001 | Roman | 315/307 |
| 6,356,034 B1 * | 3/2002 | Chen | 315/209 R |
| 7,045,969 B1 * | 5/2006 | Chou | 315/247 |
| 7,095,637 B2 * | 8/2006 | Chou | 363/44 |
| 7,224,589 B2 * | 5/2007 | Chou et al. | 363/21.04 |
| 2003/0062832 A1 | 4/2003 | Nishiura et al. | |

* cited by examiner

*Primary Examiner*—Haissa Philogene
(74) *Attorney, Agent, or Firm*—Peter J. Phillips (57) ABSTRACT

The present invention provides a power supply suitable for a neon light, which power supply has a continuous output and a high power factor in excess of 0.9. The present invention does not require a front-end boost converter.

17 Claims, 10 Drawing Sheets

Prior Art
Figure 1

Prior Art

Figure 10

NON-DISCONTINUOUS NEON POWER SUPPLY WITH HIGH POWER FACTOR

BACKGROUND OF THE INVENTION

The present invention relates to a power supply with a high power factor suitable for a neon light, and more particularly to a high power factor power supply which outputs a non-discontinuous waveform.

Neon power supplies are generally designed to be as simple and inexpensive as possible. It is also desirable that they have a high power factor when operated from a normal AC source. As used herein, the term "high power factor" means a power factor of at least 0.9. Some designs use a rectifier-capacitor input filter to convert the incoming AC to DC to power the output high frequency converter, but such designs result in a low power factor, typically of the order of 0.6. The output waveform is, however, continuous (or to put it another way, non-discontinuous). In order to improve the power factor, some designs run from unfiltered full wave rectified AC. This gives a power factor in excess of 0.9, but the penalty is that the output waveform is discontinuous, as it goes to zero at the end of each half cycle. For a neon lamp load, the lamp must therefore re-strike every half cycle. In a normal situation this does not present a problem. However, there are disadvantages in not having a continuous output from the power supply, including (1) the re-striking of the neon lamp load generates more EMI than one operating continuously, and (2) with incompletely processed electrodes it is possible that the repetitive re-striking when using mercury-argon lamps can result in mercury being pumped away from the ends of the lamps. This then results in dimming of the end of the lamps. Typically this occurs when lamp makers use large diameter electrodes with small diameter glass, and the electrode conversion process cannot be adequately controlled.

One way of achieving a high power factor with a continuous output waveform is by utilizing a front-end boost converter, followed by an inverter to produce the output high frequency power. While this produces a high power factor and low harmonic distortion, the additional cost of the front-end converter makes the product less competitive in the market place.

There is a need for a neon power supply having a high power factor and which outputs a continuous waveform, without the additional cost of having a front-end boost converter.

SUMMARY OF THE INVENTION

An objective of the invention is to provide a neon power supply circuit for operation on public utility AC power, which has a high power factor. Another objective of the invention is to provide a neon power supply circuit for operation on public utility AC power, which has a high power factor and does not have high inrush current. Another objective of the present invention is to provide a neon power supply for operation on public utility AC power, which has a high power factor and continuously lights the neon lamps even during the zero crossing region of the input AC line voltage.

The present invention provides a power supply suitable for a neon light, which power supply has a continuous output and a high power factor in excess of 0.9. The present invention does not require a front-end boost converter.

The invention provides a power supply circuit for connection to a standard AC power source and for providing a high power factor suitable to operate a neon light source comprising: a rectifier circuit for connection to a standard AC power source and for providing rectified power; a driver connected to receive the rectified power and for providing a high frequency signal higher than the frequency of the AC power source; a half bridge converter for receiving the high frequency signal and for alternatingly conducting two semiconductor switches; a pump circuit connected to the semiconductor switches for providing a continuous voltage signal with a high power factor suitable for operating a neon light source.

The invention provides a power supply circuit for connection to a standard AC power source and for providing a high power factor suitable to operate a neon light source comprising: an EMI filter for connection to a standard power source and for providing a filtered signal; a driver connected to receive the rectified power and for providing a high frequency signal; a half bridge converter for receiving the high frequency signal, said converter comprising two transistors connected in series with the gates connected to the driver and the source of one transistor connected to the drain of the other transistor at a junction point; and a pump circuit connected to the junction point of the half bridge converter for providing a continuous voltage signal with a high power factor suitable for operating a neon light source.

The invention provides a power supply circuit for connection to a standard AC power source and for providing a high power factor suitable to operate a neon light source comprising: an EMI filter for connection to a standard power source and for providing a filtered signal; a driver connected to receive the rectified power and for providing a high frequency signal of about 20-40 KHz; a half bridge converter for receiving the high frequency signal, said converter comprising two transistors connected in series with the gates connected to the driver and the source of one transistor connected to the drain of the other transistor at a junction point; a pump circuit connected to the junction point of the half bridge converter for providing a continuous voltage signal with a high power factor suitable for operating a neon light source; said pump comprising two diodes connected in series, a first capacitor connected between the junction of the two diodes and the two semiconductor switches, a coil connected between the first capacitor ad the junction of the two diodes, and a second capacitor connected at the end of the two diodes.

The invention provides a power supply circuit for connection to a standard AC power source and for providing a high power factor suitable to operate a neon light source comprising: a first circuit for connection to a standard AC power source and for alternatingly conducting two semiconductor switches; a pump circuit connected to the semiconductor switches for providing a continuous voltage signal with a high power factor suitable for operating a neon light source.

Other objects and advantages of the invention will become apparent from the following detailed description of a preferred embodiment, appended claims and accompanying drawings.

DESCRIPTION OF A PREFERRED EMBODIMENT

An embodiment of a power supply will be described, but the invention is not limited to the embodiment.

The invention provides a power supply circuit for connection to a standard AC power source and for providing a high power factor suitable to operate a neon light source comprising: a rectifier circuit for connection to a standard AC power source and for providing rectified power; a driver connected to receive the rectified power and for providing a high frequency signal higher than the frequency of the AC power source; a half bridge converter for receiving the high frequency signal and for alternately conducting two semiconductor switches; a pump circuit connected to the semiconductor switches for providing a continuous voltage signal with a high power factor suitable for operating a neon light source.

The power supply circuit may further comprise an EMI filter filtering EMI from a standard AC power source and providing the filtered signal to the rectifier circuit. The pump circuit may comprise two diodes connected in series and a first capacitor connected between the junction of the two diodes and the two semiconductor switches. The pump circuit may further comprise a coil connected between the first capacitor and the junction of the two diodes. The pump circuit may further comprise a second capacitor connected at the end of the two diodes. The semiconductor switches may comprise two transistors having their gates connected to receive the high frequency signal for alternately conducting the two transistors, and wherein the two transistors are connected in series with the source of one transistor connected to the drain of the other transistor. The driver may provide a high frequency signal of about 20-40 kHz.

The invention provides a power supply circuit for connection to a standard AC power source and for providing a high power factor suitable to operate a neon light source comprising: an EMI filter for connection to a standard power source and for providing a filtered signal; a driver connected to receive the rectified power and for providing a high frequency signal; a half bridge converter for receiving the high frequency signal, said converter comprising two transistors connected in series with the gates connected to the driver and the source of one transistor connected to the drain of the other transistor at a junction point; and a pump circuit connected to the junction point of the half bridge converter for providing a continuous voltage signal with a high power factor suitable for operating a neon light source.

The driver may provide a high frequency signal of about 20-40 KHz. The pump may comprise two diodes connected in series, a first capacitor connected between the junction of the two diodes and the two semiconductor switches, a coil connected between the first capacitor and the junction of the two diodes, and a second capacitor connected at the end of the two diodes.

The invention provides a power supply circuit for connection to a standard AC power source and for providing a high power factor suitable to operate a neon light source comprising: an EMI filter for connection to a standard power source and for providing a filtered signal; a driver connected to receive the rectified power and for providing a high frequency signal of about 20-40 KHz; a half bridge converter for receiving the high frequency signal, said converter comprising two transistors connected in series with the gates connected to the driver and the source of one transistor connected to the drain of the other transistor at a junction point; a pump circuit connected to the junction point of the half bridge converter for providing a continuous voltage signal with a high power factor suitable for operating a neon light source; said pump comprising two diodes connected in series, a first capacitor connected between the junction of the two diodes and the two semiconductor switches, a coil connected between the first capacitor ad the junction of the two diodes, and a second capacitor connected at the end of the two diodes.

The invention provides a power supply circuit for connection to a standard AC power source and for providing a high power factor suitable to operate a neon light source comprising: a first circuit for connection to a standard AC power source and for alternatingly conducting two semiconductor switches; a pump circuit connected to the semiconductor switches for providing a continuous voltage signal with a high power factor suitable for operating a neon light source.

The pump may comprise two diodes connected in series, a first capacitor connected between the junction of the two diodes and the two semiconductor switches, a coil connected between the first capacitor and the junction of the two diodes, and a second capacitor connected at the end of the two diodes. The first circuit may comprise a rectifier circuit for connection to a standard AC power source and for providing rectified power, a driver connected to receive the rectified power and for providing a high frequency signal higher than the frequency of the AC power source, and a half bridge converter for receiving the high frequency signal and for alternatingly conducting two semiconductor switches. The power supply circuit may further comprise an EMI filter filtering EMI from a standard AC power source and providing the filtered signal to the rectifier circuit. The first circuit may comprise a rectifier circuit for connection to a standard AC power source and for providing rectified power, a driver connected to receive the rectified power and for providing a high frequency signal higher than the frequency of the AC power source, and a half bridge converter for receiving the high frequency signal and for alternatingly conducting two semiconductor switches. The driver may provide a high frequency signal of about 20-40 kHz.

An embodiment of a power supply according to the invention will be given, after a description of a power supply according to the prior art.

Figure 1:
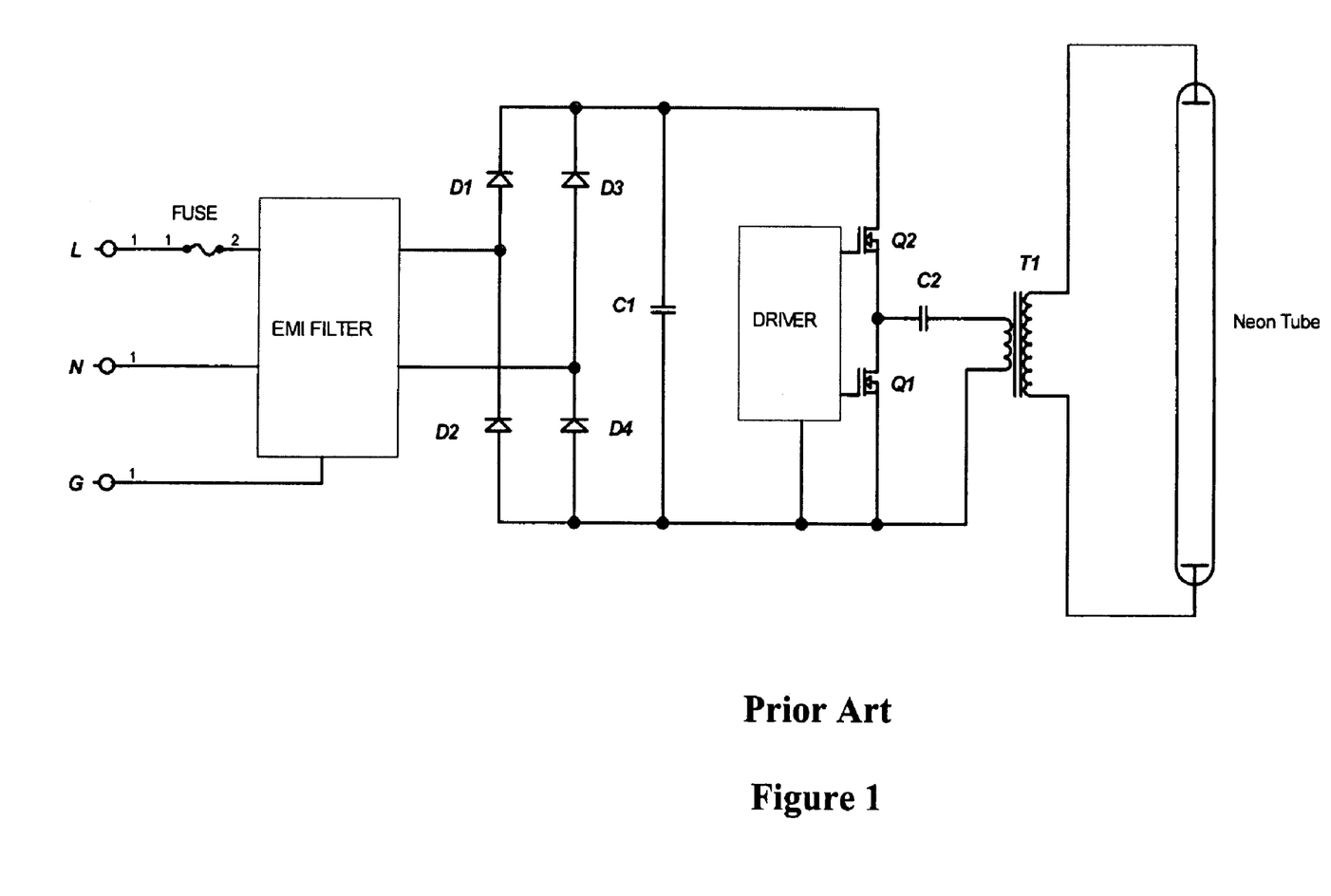
FIG. 1 shows a simplified schematic of an existing neon power supply running from full wave rectified AC.

Reference will now be made to FIG. 1, which shows a simplified schematic of an existing neon power supply running from full wave rectified AC. The incoming AC line is fused, and then fed to the EMI filter and to a diode bridge D1, D1, D3, and D4. The resulting raw rectified AC is then used to power the output half-bridge converter comprising Q1 and Q2 and the associated drive circuit. Capacitor C1 filters the pulsating high frequency current generated by the output inverter. Capacitor C2 blocks DC from primary the high reactance output transformer T1. The high reactance of the transformer delivers a quasi-constant current suitable for a neon lamp load. The circuit waveforms are depicted in FIG. 2.

Figure 2:
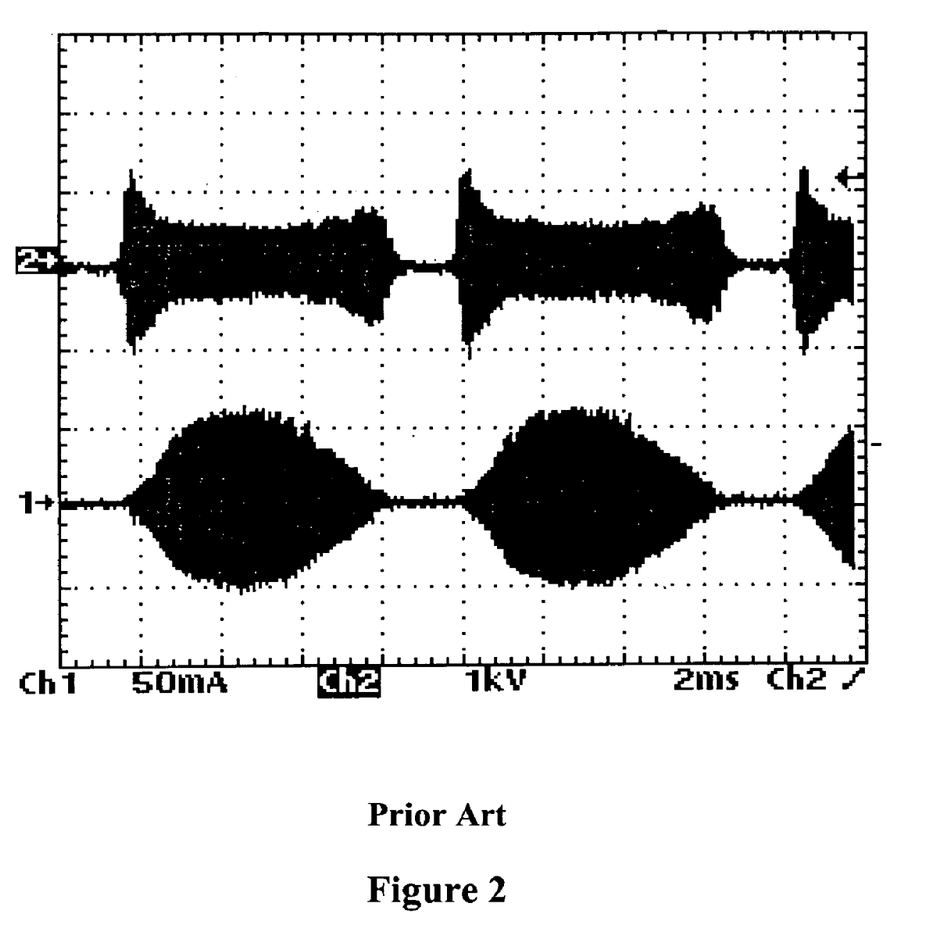
FIG. 2 shows an output waveform from the circuit of FIG. 1.

In FIG. 2, the top waveform is the voltage across the tube, and the lower waveform is the current through the tube. The voltage is discontinuous as the line voltage passes through zero, and the current also falls to zero during this period. The cusp shape of the voltage waveform is a result of the negative impedance of the tube, with the voltage rising as the current falls. Because the voltage and current are discontinuous, this circuit has the disadvantages described above. The circuit of FIG. 3, which illustrates an embodiment of a power supply according to the invention. This circuit provides sufficient voltage in the valley area to sustain conduction, and therefore provides a non-discontinuous power source. It provides a good power factor and does not suffer from a high inrush current at start-up, as would be the case with a capacitive input filter, or with a conventional power factor stage.

When the circuit of FIG. 2 is operating, with Q2 conducting and operating from an instantaneous line voltage greater than the voltage on C4, C3 charges through L1 and D6, and the resulting current provides an increment of charge to the capacitor C4. When the line voltage is less than the voltage on C4, there will be no charge increment passed to C4. Capacitor C4 is a large electrolytic capacitor of sufficient size to exhibit only a small voltage discharge when providing power to the inverter circuit via D7. Current will only flow through D7 when the instantaneous input line voltage is less than the voltage on C3, which is during the valley period of the above waveforms. This then allows the output inverter circuit to continue operation during this interval. As the output transformer of the inverter provides a current limited output, the lamp compliance voltage will determine the output voltage. This will be by design some value significantly less than the open circuit voltage of the transformer. The value of the voltage on C4 and the turns ratio of the transformer are set so that at the maximum lamp load the output current in the lamp is continuous.

Figure 3:
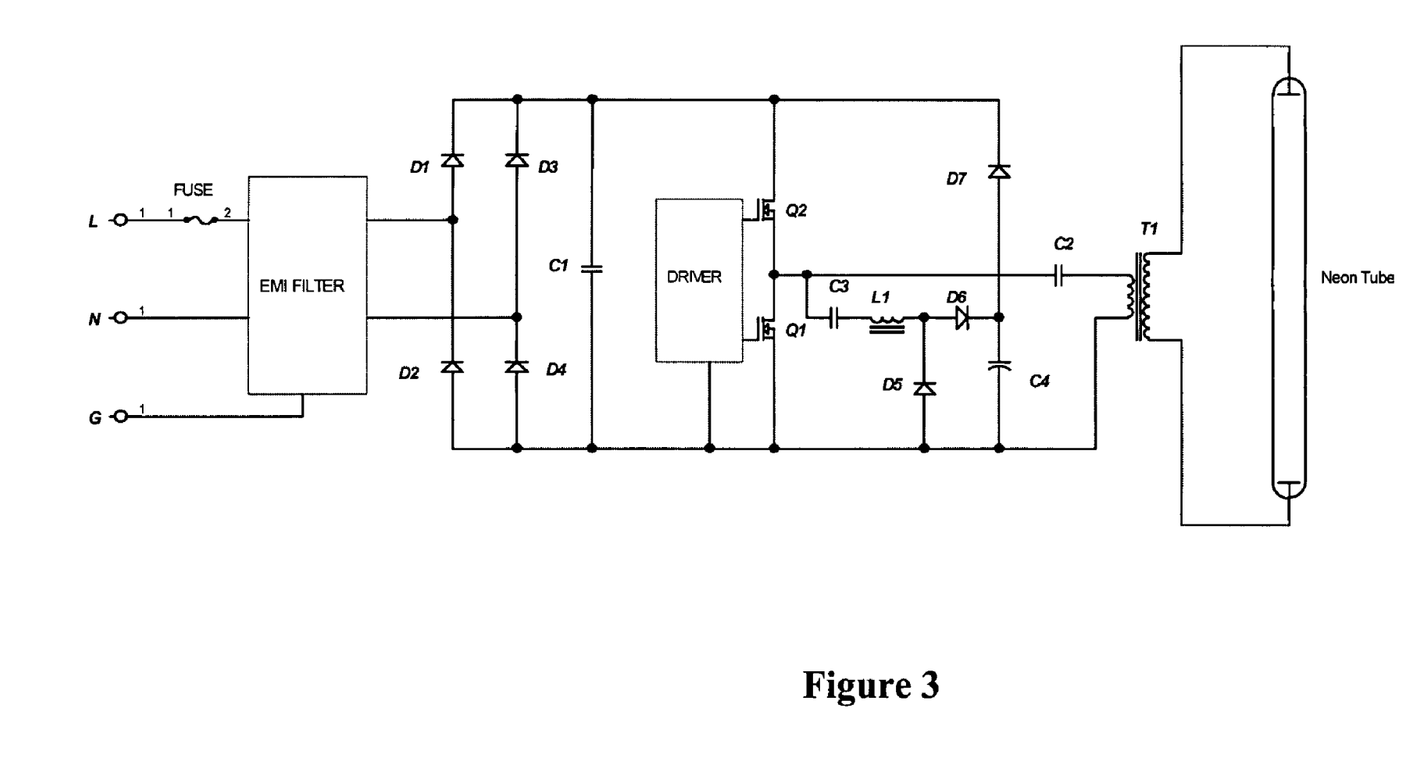
FIG. 3 shows an embodiment of a high power factor power supply circuit according to the invention.

The resonant value of L1 and C3 is set to at least twice the operating frequency of the unit to minimize switching losses in Q1 and Q2.

Figure 4:
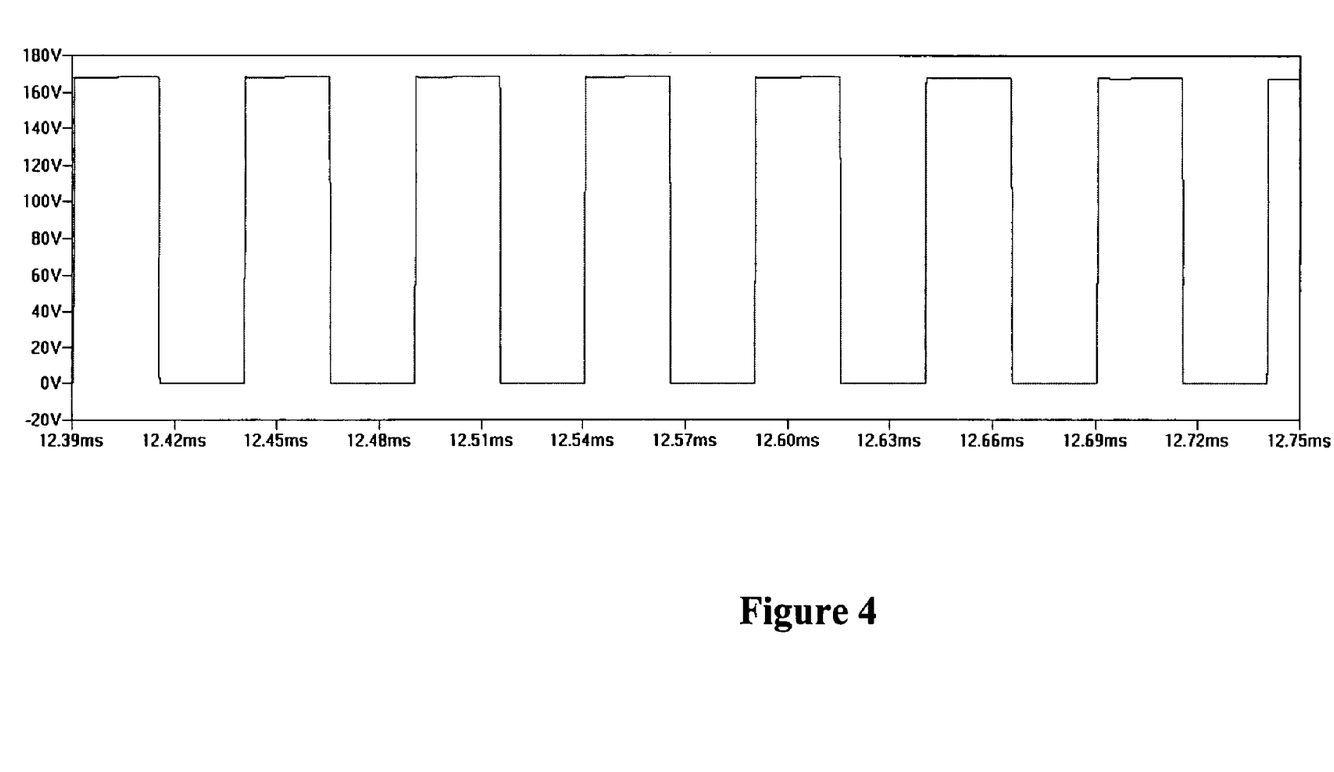
FIG. 4 shows a voltage waveform at the junction of Q1 drain and Q2 source from a Spice simulation of the circuit of FIG. 3.
Figure 5:
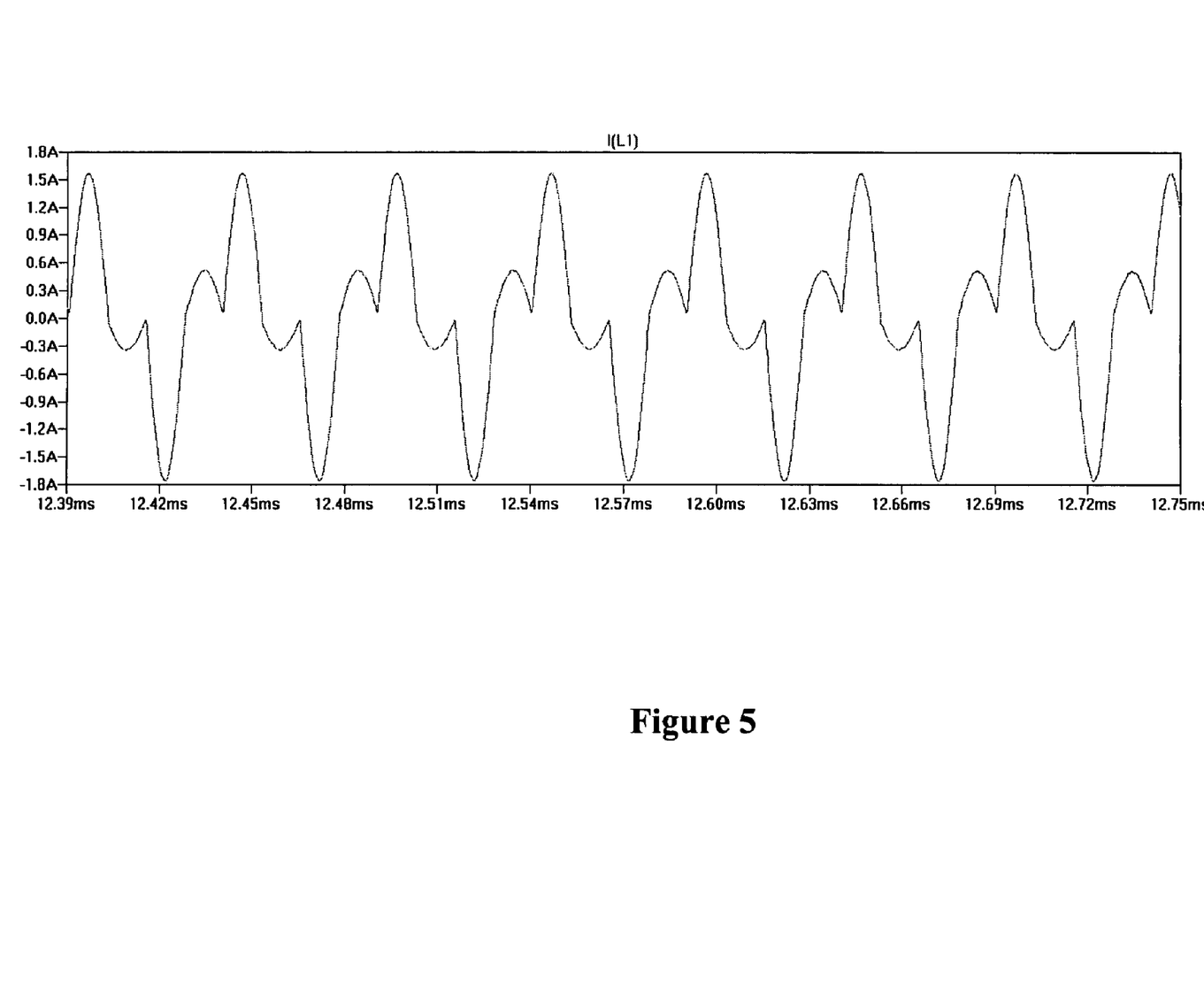
FIG. 5 shows a waveform of the current in inductor L1 and capacitor C3 of the circuit of FIG. 3.

FIG. 4 is the voltage waveform at the junction of Q1 drain and Q2 source from a Spice simulation of the above circuit. FIG. 5 shows the corresponding current waveform in inductor L1 and capacitor C3. With the values of L1 and C3 chosen for this example, this current is quite low at the transition times of Q1 and Q2. The value of C3 will determine the amount of the charge transferred to C4. In this case L1 is set to 320 uH and C3 to 0.05 uF.

Figure 6:
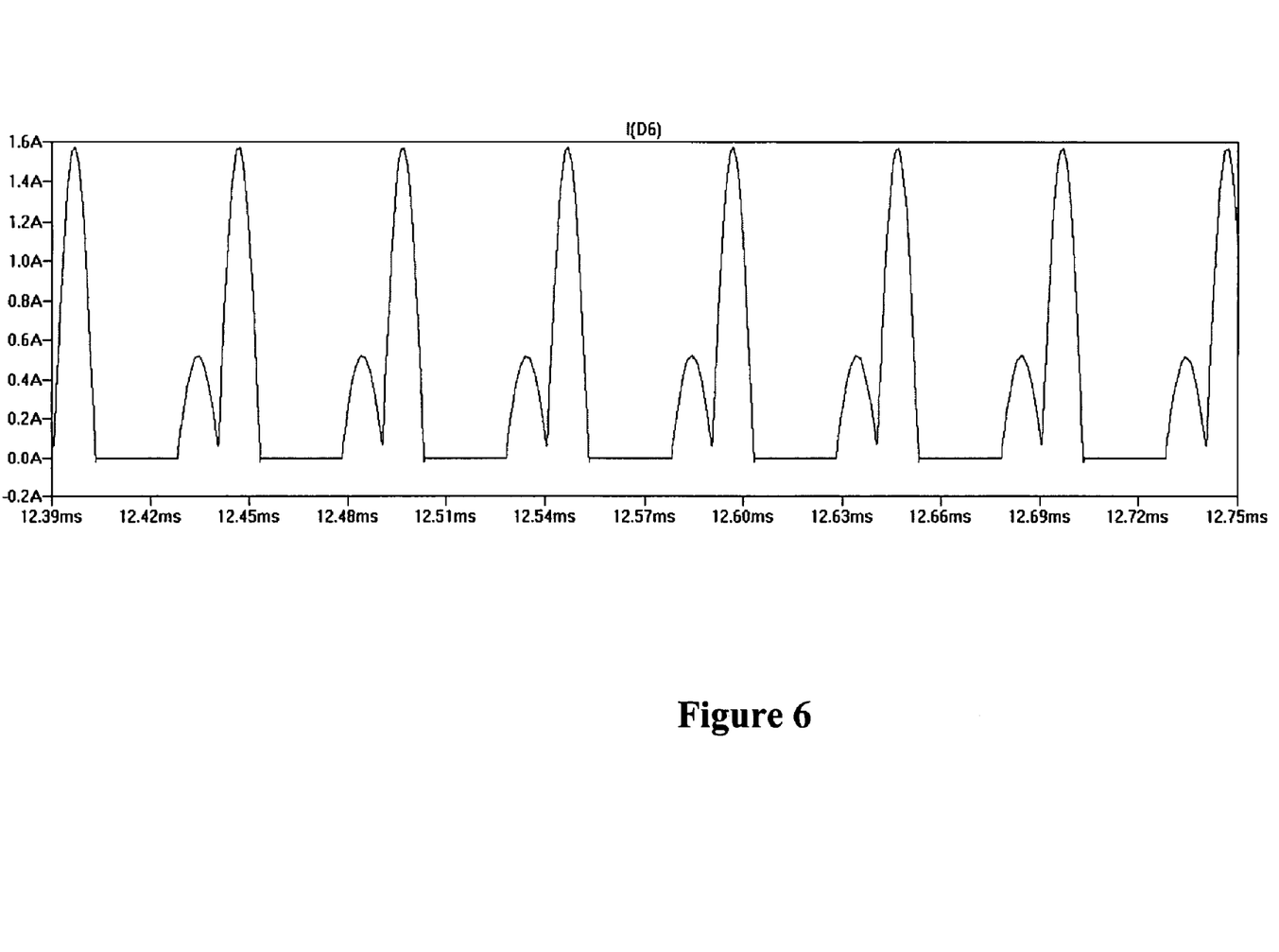
FIG. 6 depicts the current into the storage capacitor C4 of the circuit of FIG. 5, which provides the voltage to allow the inverter to operate during the valley period.

FIG. 6 depicts the current into the storage capacitor C4, which provides the voltage to allow the inverter to operate during the valley period.

Figure 7:
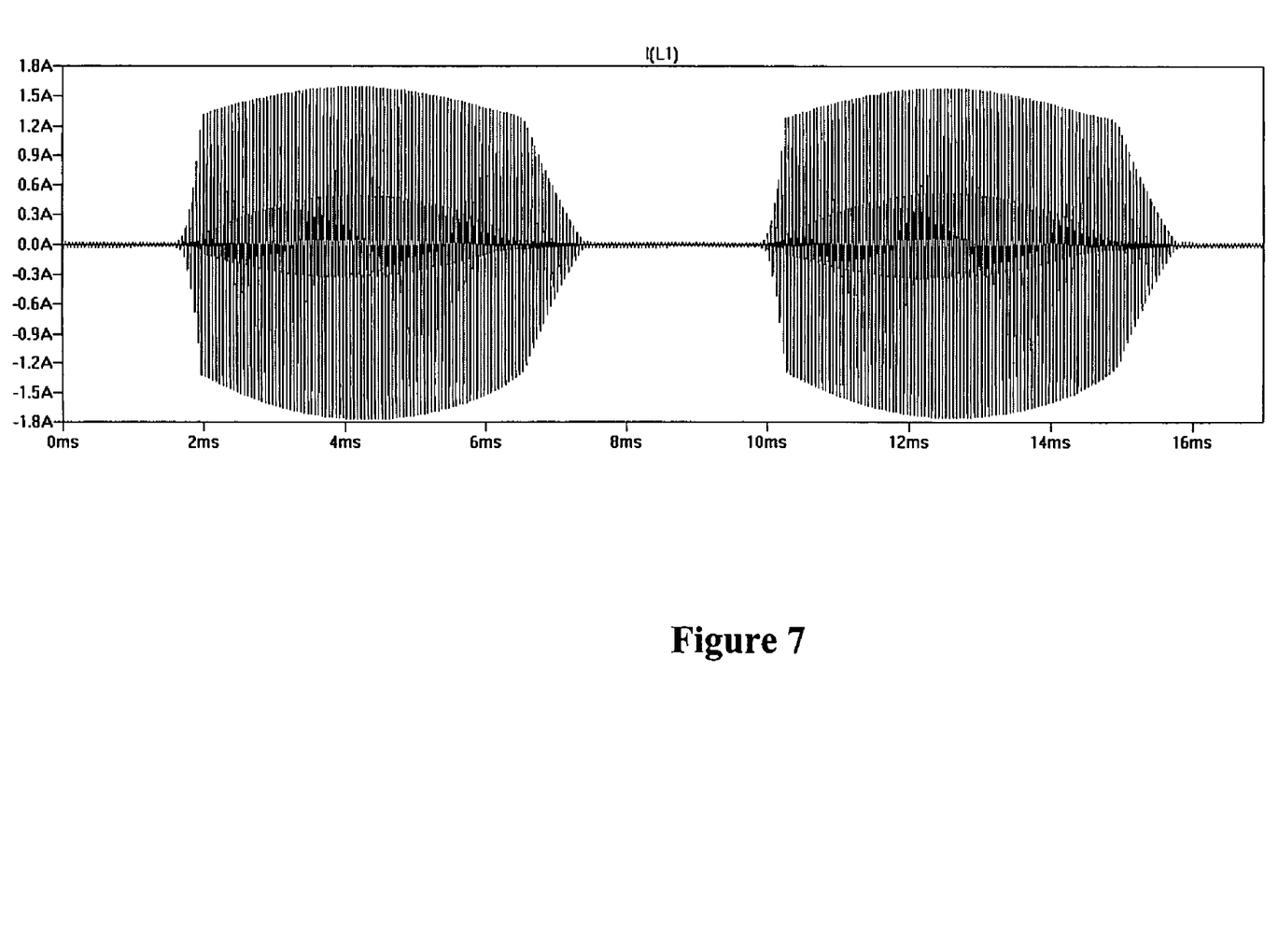
FIG. 7 is a waveform showing the current in inductor L1 over a full cycle of operation.

The current in inductor L1 over a full cycle of operation is shown in FIG. 7. The current in the inductor during the valley period is negligible.

Figure 8:
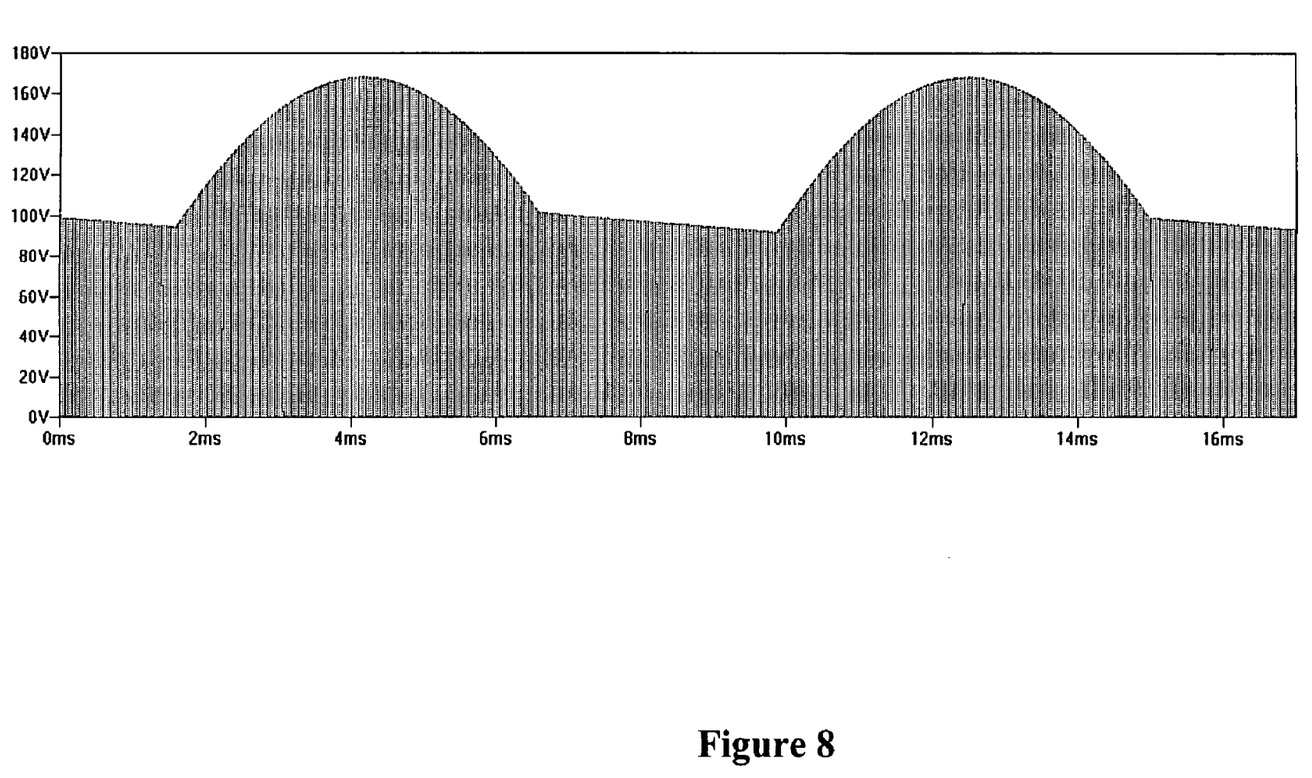
FIG. 8 is a waveform showing the voltage at the junction of Q1 drain and Q2 source of the circuit of FIG. 3.

The effect of this circuit may be seen in FIG. 8, which is the voltage at the junction of Q1 drain and Q2 source. In this simulation the circuit is providing approximately 100 volts for operation in the valley period.

Figure 9:
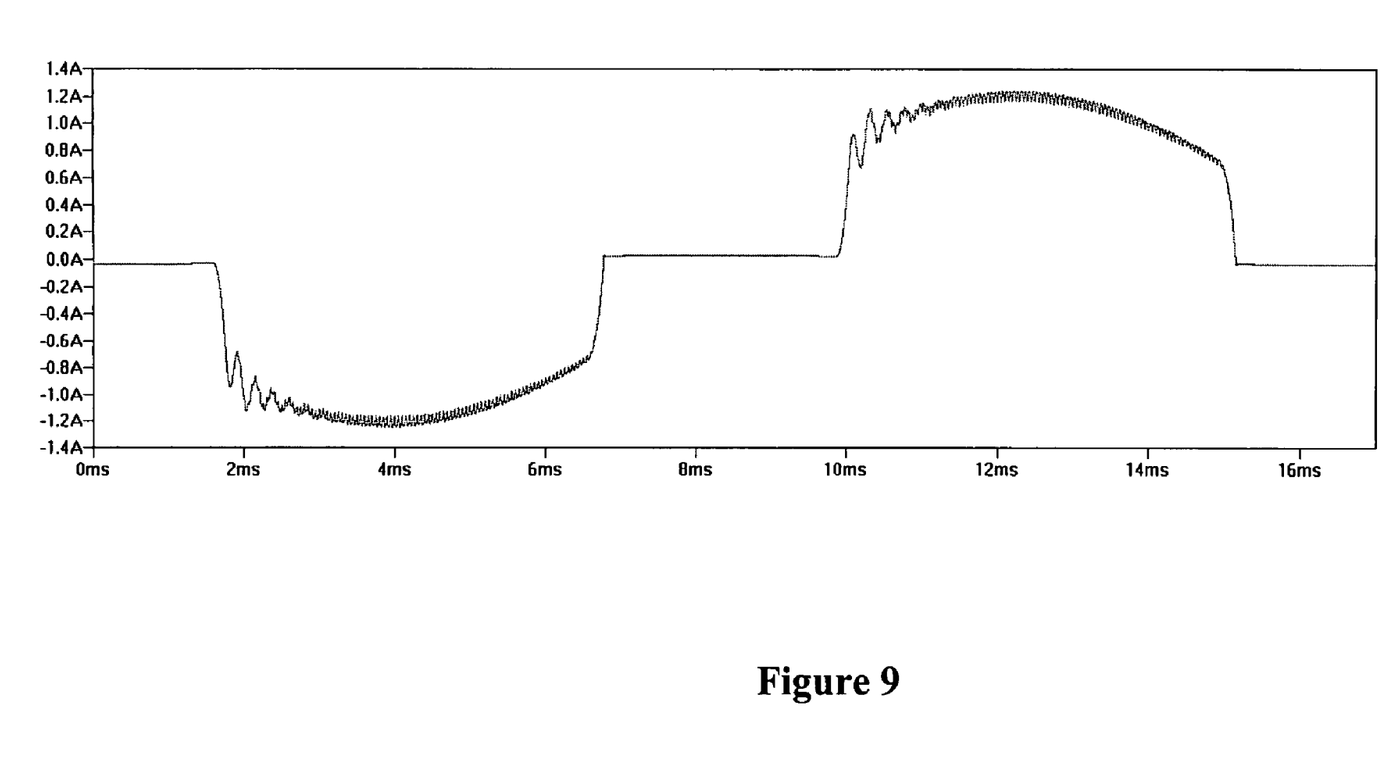
FIG. 9 shows a waveform of the current drawn from the AC input line of the circuit of FIG. 3.

The current drawn from the AC input line is shown in FIG. 9. For this simulation the RMS current is 0.81 amps, and the VA product is 97.5. The computed power input from the simulation is 92.8 watts, giving a power factor of (92.8/97.5) or 0.95.

Figure 10:
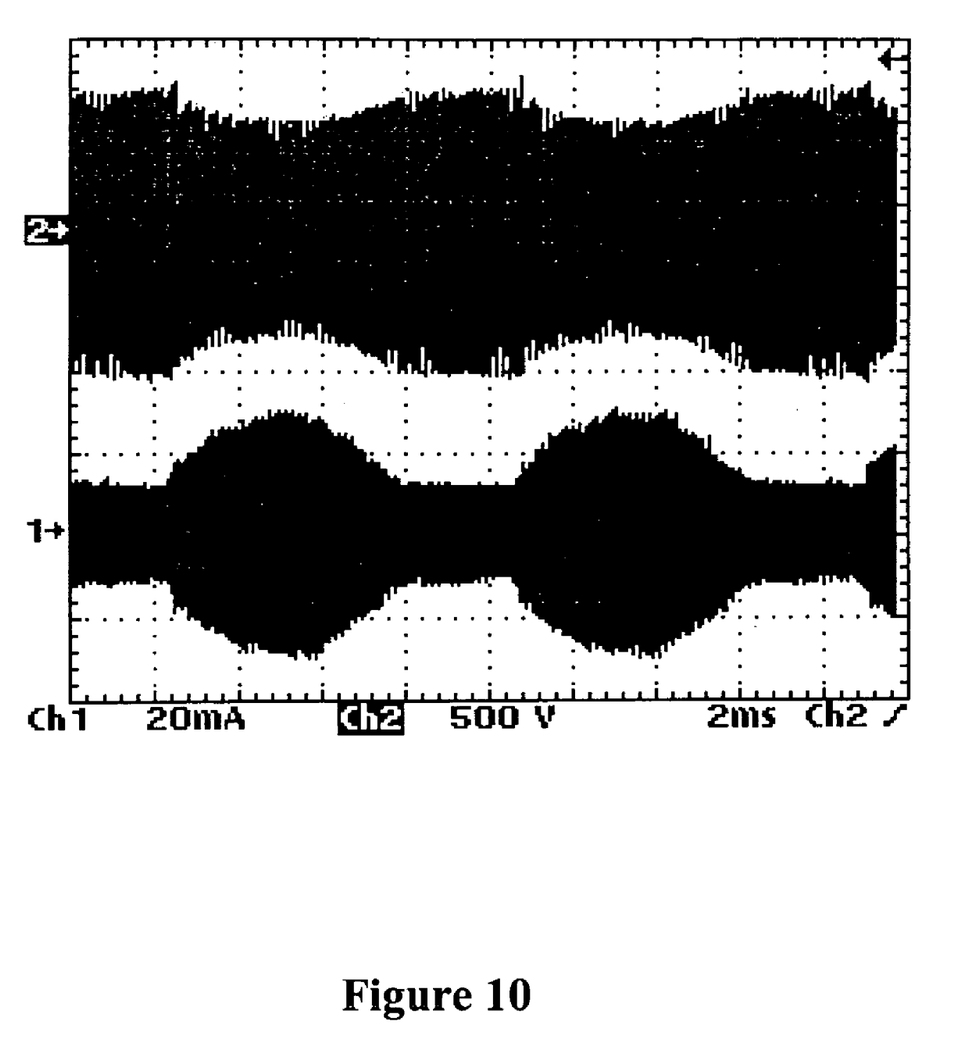
FIG. 10 is a waveform envelope output from the circuit of FIG. 3.

In FIG. 10 (right), actual waveform envelopes from an operating unit are shown. The effect of the valley fill technique can be seen by comparison of this Fig. with FIG. 2.

Although one embodiment has been shown and described, the invention is not limited to this embodiment, as variations may be made to this circuit without departing from the invention. The scope of the invention is determined by reference to the claims.

We claim:

1. A power supply circuit for connection to a standard AC power source and for providing a high power factor suitable to operate a neon light source comprising:
    a rectifier circuit for connection to a standard AC power source and for providing rectified power;
    a driver connected to receive the rectified power and for providing a high frequency signal higher than the frequency of the AC power source;
    a half bridge converter for receiving the high frequency signal and for alternatingly conducting two semiconductor switches;
    a pump circuit connected to the semiconductor switches for providing a continuous voltage signal with a high power factor suitable for operating a neon light source.

2. The power supply circuit of claim 1 further comprising an EMI filter filtering EMI from a standard AC power source and providing the filtered signal to the rectifier circuit.

3. The power supply circuit of claim 1 wherein the pump circuit comprises two diodes connected in series and a first capacitor connected between the junction of the two diodes and the two semiconductor switches.

4. The power supply circuit of claim 1 wherein the pump circuit further comprises a coil connected between the first capacitor and the junction of the two diodes.

5. The power supply circuit of claim 1 wherein the pump circuit further comprises a second capacitor connected at the end of the two diodes.

6. The power supply circuit of claim 1 wherein the semiconductor switches comprise two transistors having their gates connected to receive the high frequency signal for alternatingly conducting the two transistors, and wherein the two transistors are connected in series with the source of one transistor connected to the drain of the other transistor.

7. The power supply circuit of claim 1 wherein the driver provides a high frequency signal of about 20-40 kHz.

8. A power supply circuit for connection to a standard AC power source and for providing a high power factor suitable to operate a neon light source comprising:
    an EMI filter for connection to a standard AC power source and for providing a filtered signal;
    a driver connected to receive a rectified power and for providing a high frequency signal;
    a half bridge converter for receiving the high frequency signal, said converter comprising two transistors connected in series with their gates connected to the driver and the source of one transistor connected to the drain of the other transistor at a junction point;
    a pump circuit connected to the junction point of the half bridge converter for providing a continuous voltage signal with a high power factor suitable for operating a neon light source.

9. The power supply circuit of claim 8 wherein the driver provides a high frequency signal of about 20-40 KHz.

10. The power supply circuit of claim 8, said pump circuit comprising two diodes connected in series, a first capacitor connected between the junction of the two diodes and the two transistors, a coil connected between the first capacitor and the junction of the two diodes, and a second capacitor connected at the end of the two diodes.

11. A power supply circuit for connection to a standard AC power source and for providing a high power factor suitable to operate a neon light source comprising:

an EMI filter for connection to a standard power source and for providing a filtered signal;

a driver connected to receive a rectified power and for providing a high frequency signal of about 20-40 KHz;

a half bridge converter for receiving the high frequency signal, said converter comprising two transistors connected in series with their gates connected to the driver and the source of one transistor connected to the drain of the other transistor at a junction point;

a pump circuit connected to the junction point of the half bridge converter for providing a continuous voltage signal with a high power factor suitable for operating a neon light source;

said pump circuit comprising two diodes connected in series, a first capacitor connected between the junction of the two diodes and the transistors, a coil connected between the first capacitor and the junction of the two diodes, and a second capacitor connected at the end of the two diodes.

12. A power supply circuit for connection to a standard AC power source and for providing a high power factor suitable to operate a neon light source comprising:

a first circuit for connection to a standard AC power source and for alternatingly conducting two semiconductor switches;

a pump circuit connected to the semiconductor switches for providing a continuous voltage signal with a high power factor suitable for operating a neon light source.

13. The power supply circuit of claim 12, said pump circuit comprising two diodes connected in series, a first capacitor connected between the junction of the two diodes and the two semiconductor switches, a coil connected between the first capacitor and the junction of the two diodes, and a second capacitor connected at the end of the two diodes.

14. The power supply circuit of claim 12, wherein the first circuit comprises a rectifier circuit for connection to said standard AC power source and for providing rectified power, a driver connected to receive the rectified power and for providing a high frequency signal higher than the frequency of the AC power source, and a half bridge converter for receiving the high frequency signal and for alternatingly conducting two semiconductor switches.

15. The power supply circuit of claim 14, further comprising an EMI filter filtering EMI from said standard AC power source and providing the filtered signal to the rectifier circuit.

16. The power supply circuit of claim 14, wherein the semiconductor switches comprise two transistors having their gates connected to receive the high frequency for alternatingly conducting the two transistors, and wherein the two transistors are connected in series with the source of one transistor connected to the drain of the other transistor.

17. The power supply circuit of claim 14, wherein the driver provides a high frequency signal of about 20-40 kHz.

* * * * *